Aug. 14, 1934.   H. S. EBERHARD   1,970,001
VEHICLE CONSTRUCTION
Filed Dec. 14, 1932    3 Sheets-Sheet 1
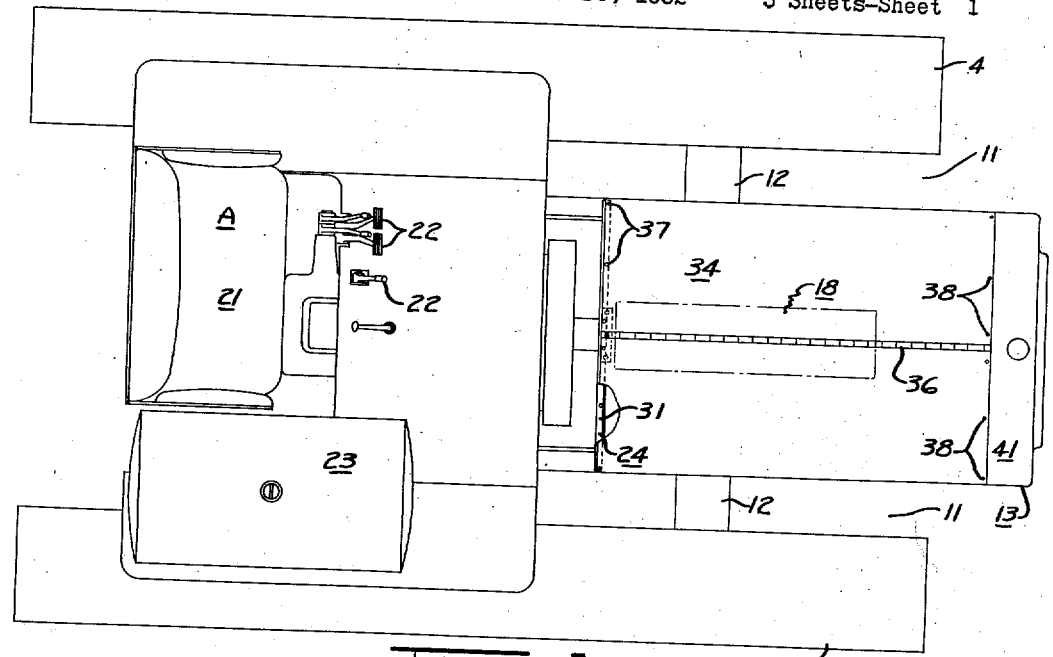
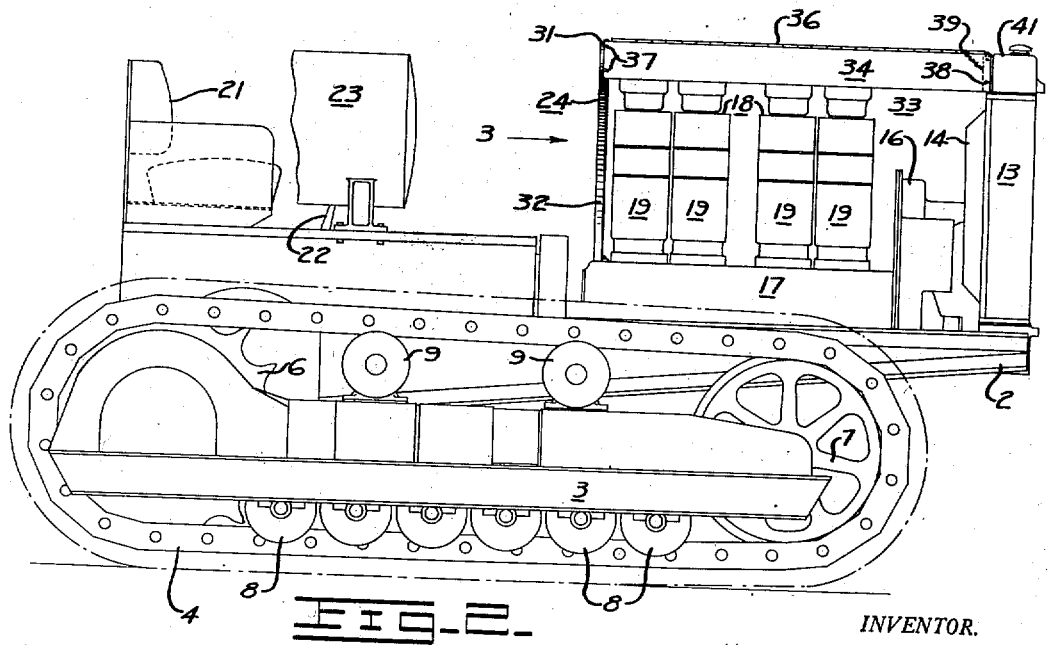
INVENTOR.
HARMON S. EBERHARD
BY
ATTORNEY.

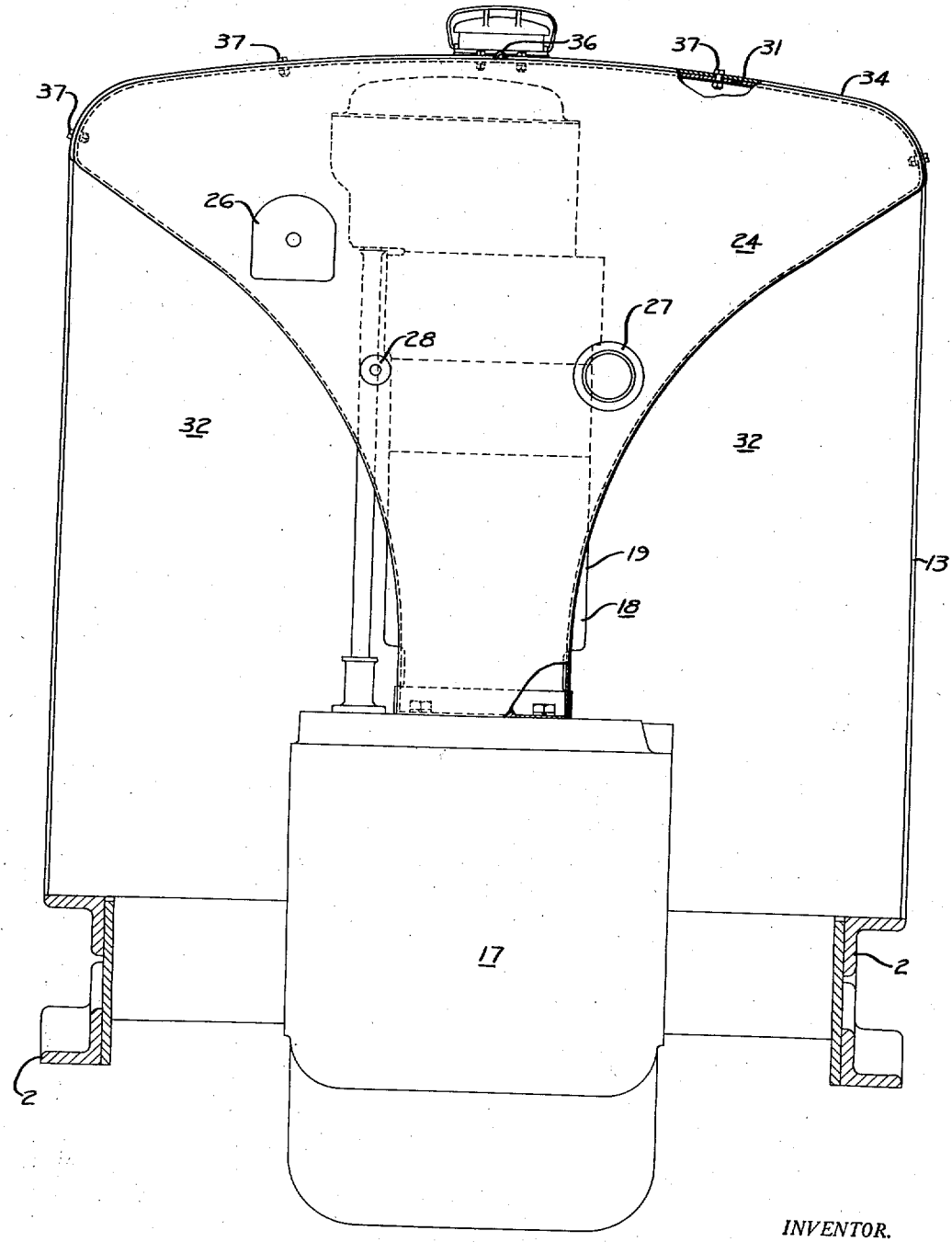

Aug. 14, 1934.   H. S. EBERHARD   1,970,001
VEHICLE CONSTRUCTION
Filed Dec. 14, 1932   3 Sheets-Sheet 3
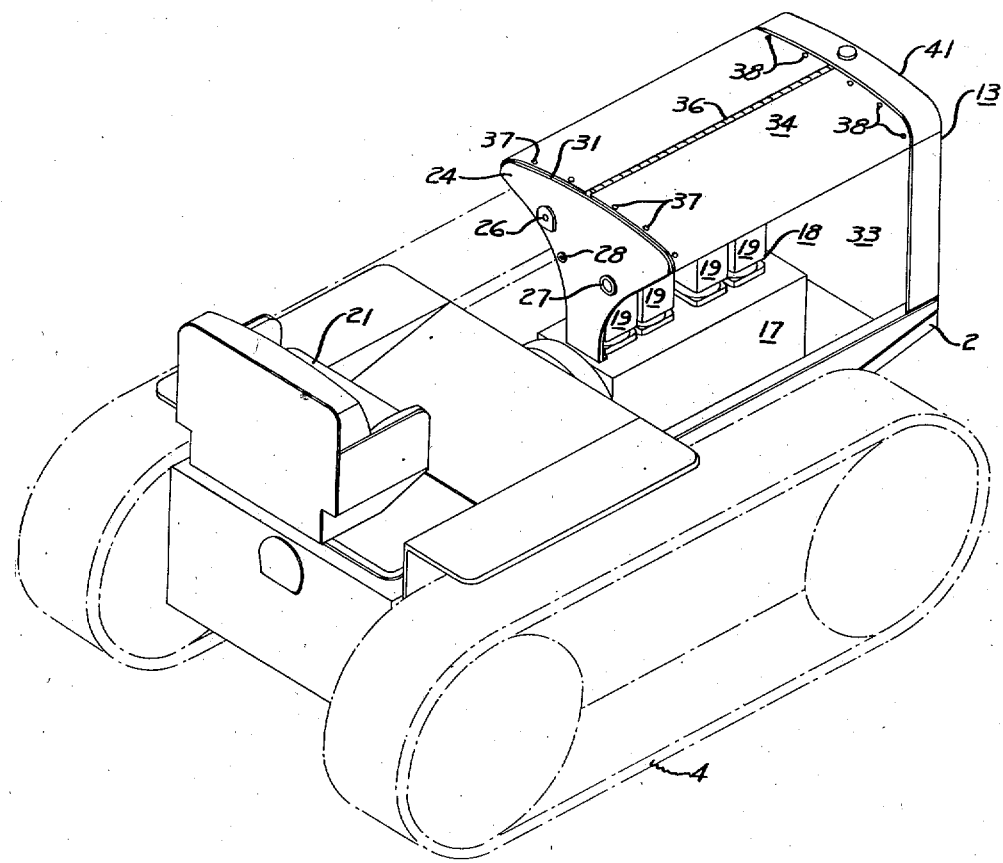
FIG-4-
INVENTOR.
HARMON S. EBERHARD
BY
ATTORNEY.

Patented Aug. 14, 1934

1,970,001

UNITED STATES PATENT OFFICE 1,970,001

VEHICLE CONSTRUCTION

Harmon S. Eberhard, San Leandro, Calif., assignor to Caterpillar Tractor Co., San Leandro, Calif., a corporation of California Application December 14, 1932, Serial No. 647,193

7 Claims. (Cl. 180—54)

My invention relates to vehicles, and particularly to tractors of the track type wherein a dash or instrument board is employed.

In vehicles of the character described, especially large track-type tractors adapted for heavy-duty work such as for logging or bulldozing, the radiator is large and extends to a considerable height above the body of the tractor. If an instrument board or dash is employed, which is of substantially the same shape as the radiator, the dash so obstructs the vision of the driver at the driver's station or seat in back of the dash, as to make driving of the machine a hazard. The driver has difficulty in seeing objects in the path of the tractor unless such objects are at a considerable distance away. This is not only dangerous for the driver himself, but also for one who might accidently step across the path of the tractor and out of the driver's field of vision.

Objects of invention

My invention is designed to obviate the foregoing described difficulty; and it is, therefore one of the primary objects of my invention to provide a vehicle construction, of the character described and with the parts so arranged, as to increase the driver's field of vision.

Another object of my invention is to provide a dash of such shape as to enhance visibility.

Another object of my invention is to provide a dash, which is shaped to increase materially the esthetic appearance of the tractor.

A further object of my invention is to provide a construction of the character described, which permits the use of an engine cover positioned between the dash and the radiator without interfering with visibility.

An additional object of my invention is to provide an economical construction.

Description of drawings

Reference will now be made to the drawings for a detailed description of a preferred embodiment of my invention, in which drawings:

Fig. 1 is a schematic plan view of the vehicle construction of my invention.

Fig. 2 is a side elevation of a more or less diagrammatic nature.

Fig. 3 is a rear elevation, on an enlarged scale, illustrating the dash construction and looking in the direction of arrow 3 of Fig. 2. Parts are omitted from the view to illustrate more clearly the construction.

Fig. 4 is a schematic isometric view, illustrating the construction of my invention, with parts omitted to emphasize the construction.

Description of preferred embodiment

The tractor is of the track type, and comprises a tractor body or main frame which includes spaced apart side-supporting members 2 (Figs. 2, 3, and 4) in the form of forwardly-extending channels. As is usual in tractors of the track type, truck frames 3 are provided at each side of the tractor body or main frame, and are hingedly connected thereto adjacent their rear ends. Encompassing each of the truck frames is (Fig. 2) an endless track 4 engaging final drive sprocket wheel 16, and also front idler wheel 7 supported on the truck frame. Track rollers 8, which ride on the endless track 4, are mounted on the under side of the truck frame; and rollers 9 are mounted on top of the truck frame, to support the upper reach of the endless track.

In the construction of the present invention, each of truck frames 3 is positioned away from the side channels 2 of the main frame, to provide comparatively wide open spaces 11 (Fig. 1). The front of the tractor body rests on a transversely-extending equalizer bar or spring 12, which in turn has its ends supported on the truck frames. A radiator 13 is positioned at the front of the tractor body and is supported on and between the side channels 2 thereof. The usual fan assembly 14 (Fig. 2) and timing gear housing 16 are positioned on the tractor body and at the rear of radiator 13; and crankcase 17 is supported in the tractor body and in back of the radiator. The engine 18, which in the present instance, includes a plurality of separate cylinders 19, is secured over crankcase 17. Although I have disclosed an engine comprising individual cylinders, the engine may be of the solid block type construction.

A driver's station (Fig. 1), in the form of seat 21, is positioned at the rear of the tractor; and tractor operating controls 22 are at one side of the tractor and in front of the driver's seat to be readily accessible for manipulation by the driver. Fuel tank 23 is mounted at the side of driver's seat 21; and dash 24 is positioned at a dash station or location approximately halfway between the radiator and the driver's seat. In this connection, any suitable fastening means, such as bolts shown in Fig. 3, can be employed to secure the bottom of the dash to the place on the machine where the dash is to be mounted, i. e., the dash station. The dash provides an instrument board for supporting various gauges and controls (Fig. 3), such as hot air control 26, oil pressure gauge 27, and ignition switch 28.

The aforementioned parts are so arranged and particularly the dash is so shaped, as to enhance visibility for the driver. In the present instance, dash 24 (Figs. 1, 3, and 4) is formed with a peripheral side flange 31; and at the top its width is equal to that of the radiator and it extends to substantially the same height as the radiator, being substantially horizontally in line with the top of the radiator. The side edges of dash 24 are non-parallel and are concavely shaped to converge inwardly, so as to form a comparatively narrow bottom edge; the bottom portion of the dash between the lower ends of its sides being in width, as can be seen from Fig. 3, equal to substantially one half the distance between either side of the dash and the projection of a side of the radiator adjacent said side of the dash. Also, as can be seen most clearly from Fig. 3, the width of the bottom edge is substantially equal to or not greater than the width of the engine 18. Thus, by the described construction of the dash, the sides thereof are actually recessed, as indicated at 32, to offer minimum obstruction to the driver's vision.

The side spaces 33 between the dash and the radiator are uncovered (Figs. 2 and 4), thus leaving the sides of engine 18 uncovered. Engine 18, however, is covered at the top by means of cover 34, which comprises the usual half sections hingedly connected together, as indicated at 36. The cover is positioned between the dash and the radiator; and the rear thereof is secured to top flange 31 of the dash by means of fasteners 37; while the front edge of the cover is similarly secured, by fasteners 38, to ledge 39 on the rear of top radiator tank 41.

*Discussion*

Because of the arrangement of parts and the recessed sides of the dash, the driver's field of vision is materially increased, compared to what his field of vision would be if the dash's shape were congruent to that of the radiator's. If the driver should be looking downwardly at an acute angle, to observe low objects closely adjacent the front of the tractor, the recessed sides of the dash and the uncovered sides of the engine will permit unobstructed vision through the side space between the dash and the radiator.

It will be apparent that the construction of my invention permits the driver to look downwardly through the spaces between the tractor body and the trucks, at both sides of the tractor. Consequently, the side-supporting members 2 are readily visible to the driver; and he can also readily observe objects adjacent the front of the radiator and below the plane of the lower edge of the radiator. The sides of the radiator can be readily seen; and this, of course, permits the driver to note objects in the plane of the radiator and closely adjacent the sides thereof. In other words, the construction of my invention provides no greater obstruction to the driver's visibity than that offered by the radiator itself.

As shown in Fig. 1, the construction of my invention permits the driver's seat to be arranged at one side of the tractor, with the driver seated at a side of the tractor as indicated at A. He can readily look through the open space provided for by the recessed dash and uncovered side of the engine, at the opposite side of the engine, to observe objects at the opposite side of the engine; and since he is seated at a side of the tractor, vision is materially enhanced for objects quite some distance away from and in front of the tractor. The latter is true, because the driver can readily and without inconvenience move his head to one side, so as not to be compelled to observe the far away objects by looking over the top of the radiator.

I, therefore, claim as my invention:

1. In a tractor having a tractor body, a radiator at the forward end of said body, a dash station spaced rearwardly of said radiator intermediate the ends of said body, and an operator's seat at the rear of said dash station, the tractor being of such size, the seat being such distance away from the dash station and the dimensions of the radiator being such that if a dash at the dash station extended to the same height and were of the same width of the radiator throughout, the operator's vision would be so impaired as to impede manipulation of the tractor and to endanger safety of operation; and a dash at the dash station having a top substantially the width of the radiator and substantially horizontally in line with the top of the radiator and sides converging inwardly from said top to a position adjacent the bottom of said dash to enhance visibility.

2. In a tractor having a tractor body, a radiator at the forward end of said body, a dash station spaced rearwardly of said radiator intermediate the ends of said body, and an operator's seat at the rear of said dash station, the tractor being of such size, the seat being such distance away from the dash station and the dimensions of the radiator being such that if a dash station extended to the same height and were of the same width of the radiator throughout, the operator's vision would be so impaired as to impede manipulation of the tractor and to endanger safety of operation; and a dash at the dash station having a top substantially the width of the radiator and substantially horizontally in line with the top of the radiator, and inwardly converging sides concavely curved all the way from closely adjacent said top to a position adjacent the bottom of said dash to enhance visibility.

3. In a tractor having a tractor body, a radiator at the forward end of said body, a dash station spaced rearwardly of said radiator intermediate the ends of said body, and an operator's seat at the rear of said dash station, the tractor being of such size, the seat being such distance away from the dash station and the dimensions of the radiator being such that if a dash at the dash station extended to the same height and were of the same width of the radiator throughout, the operator's vision would be so impaired as to impede manipulation of the tractor and to endanger safety of operation; and a dash at the dash station having a top substantially the width of the radiator and substantially horizontally in line with the top of the radiator, and inwardly converging sides concavely curved all the way from closely adjacent said top to a position adjacent the bottom of said dash to enhance visibility, the bottom of said dash between the lower ends of said sides being substantially one-half the distance between either of said sides at the bottom and the projection of a side of the radiator adjacent said side.

4. A large size track-type tractor comprising a tractor body, an endless track at each side of the body and spaced therefrom, a radiator at the front of the body, an operator's station at the rear of the body, a dash station on said body between said operator's station and said radiator, the tractor being of such size, the operator's station being such distance away from the dash station and the radiator being such that if a dash at the dash station extended to the same height and were of the same width of the radiator throughout, the operator's vision would be so impaired as to impede manipulation of the tractor and to endanger safety of operation, a dash secured at said dash station, an engine between said dash and said radiator having a width substantially less than the width of said radiator, and tractor controls between said operator's station and said dash, said dash having side edges converging sharply from a width at the top substantially equal to the width of the radiator, to a width at a point substantially midway between the top and the bottom substantially equal to the width of the engine, said radiator and said body being the only obstructions to the vision of the tractor operator at the operator's station in viewing objects below or adjacent the radiator.

5. A large size track-type tractor comprising a tractor body, an endless track at each side of the body and spaced therefrom, a radiator at the front of the body, an operator's station at the rear of the body, a dash station on said body between said operator's station and said radiator, the tractor being of such size, the operator's station being such distance away from the dash station and the radiator being such that if a dash at the dash station extended to the same height and were of the same width of the radiator throughout, the operator's vision would be so impaired as to impede manipulation of the tractor and to endanger safety of operation, a dash secured at said dash station, an engine between said dash and said radiator having a width substantially less than the width of the radiator, and tractor controls between said operator's station and said dash, said dash having recessed sides starting at a location from adjacent the top thereof to enhance the operator's vision from the station to points adjacent and below the radiator.

6. In a tractor having a tractor body, endless track mechanisms supporting said body, a radiator at the forward end of said body, an operator's seat at the rear end of said body, and a dash station substantially midway between said seat and said radiator, the tractor being of such size, the seat being such distance away from the dash station and the dimensions of the radiator being such that if a dash at the dash station extended to the same height and were of the same width throughout as said radiator, the operator's vision would be so impaired as to impede manipulation of the tractor and to endanger safety of operation; a dash at said dash station having a top of substantially the same width as the width of the radiator and substantially horizontally in line with the top of the radiator and dash sides converging inwardly from said dash top to a position adjacent the bottom of said dash; an engine between said radiator and said dash of a width substantially equal to the width of the bottom of said dash; and a cover over said engine between said radiator and dash tops, the sides of said engine being otherwise uncovered, said uncovered sides of said engine and said inwardly converging sides of said dash providing unobstructed vision to points below or adjacent the radiator for the tractor operator in said seat.

7. A large size track-type tractor comprising a tractor body, an endless track at each side of said body and spaced therefrom, a radiator at the front of said body, an operator's station at the rear of said body, a dash station on said body substantially midway between said radiator and said operator's station, the tractor being of such size, the operator's station being such distance away from the dash station and the radiator being such that if a dash at the dash station extended to the same height and were of the same width of the radiator throughout, the operator's vision would be so impaired as to impede manipulation of the tractor and to endanger safety of operation, a dash secured at said dash station, the tops of said radiator and said dash being substantially horizontally in line, an engine between said dash and said radiator having a width substantially less than the width of said radiator and having the sides thereof uncovered, a cover over said engine between said dash and radiator tops, and tractor controls between said operator's station and said dash, said dash having side edges converging sharply from the top and from a width at the top substantially equal to the width of the radiator to a width at intermediate points thereof substantially equal to the width of said engine, said inwardly converging dash side edges forming recesses at locations in line with the operator's vision and cooperating with said uncovered engine sides to allow visibility from said operator's station to points adjacent and below said radiator.

HARMON S. EBERHARD.

CERTIFICATE OF CORRECTION.

Patent No. 1,970,001.

August 14, 1934.

HARMON S. EBERHARD.

It is hereby certified that error appears in the printed specification of the above numbered patent requiring correction as follows: Page 1, line 71, for "wheel 16" read wheel 6; page 2, line 110, claim 2, before "station" insert at the dash; and that the said Letters Patent should be read with these corrections therein that the same may conform to the record of the case in the Patent Office.

Signed and sealed this 18th day of September, A. D. 1934.

Leslie Frazer (Seal)

Acting Commissioner of Patents.

between said operator's station and said radiator, the tractor being of such size, the operator's station being such distance away from the dash station and the radiator being such that if a dash at the dash station extended to the same height and were of the same width of the radiator throughout, the operator's vision would be so impaired as to impede manipulation of the tractor and to endanger safety of operation, a dash secured at said dash station, an engine between said dash and said radiator having a width substantially less than the width of said radiator, and tractor controls between said operator's station and said dash, said dash having side edges converging sharply from a width at the top substantially equal to the width of the radiator, to a width at a point substantially midway between the top and the bottom substantially equal to the width of the engine, said radiator and said body being the only obstructions to the vision of the tractor operator at the operator's station in viewing objects below or adjacent the radiator.

5. A large size track-type tractor comprising a tractor body, an endless track at each side of the body and spaced therefrom, a radiator at the front of the body, an operator's station at the rear of the body, a dash station on said body between said operator's station and said radiator, the tractor being of such size, the operator's station being such distance away from the dash station and the radiator being such that if a dash at the dash station extended to the same height and were of the same width of the radiator throughout, the operator's vision would be so impaired as to impede manipulation of the tractor and to endanger safety of operation, a dash secured at said dash station, an engine between said dash and said radiator having a width substantially less than the width of the radiator, and tractor controls between said operator's station and said dash, said dash having recessed sides starting at a location from adjacent the top thereof to enhance the operator's vision from the station to points adjacent and below the radiator.

6. In a tractor having a tractor body, endless track mechanisms supporting said body, a radiator at the forward end of said body, an operator's seat at the rear end of said body, and a dash station substantially midway between said seat and said radiator, the tractor being of such size, the seat being such distance away from the dash station and the dimensions of the radiator being such that if a dash at the dash station extended to the same height and were of the same width throughout as said radiator, the operator's vision would be so impaired as to impede manipulation of the tractor and to endanger safety of operation; a dash at said dash station having a top of substantially the same width as the width of the radiator and substantially horizontally in line with the top of the radiator and dash sides converging inwardly from said dash top to a position adjacent the bottom of said dash; an engine between said radiator and said dash of a width substantially equal to the width of the bottom of said dash; and a cover over said engine between said radiator and dash tops, the sides of said engine being otherwise uncovered, said uncovered sides of said engine and said inwardly converging sides of said dash providing unobstructed vision to points below or adjacent the radiator for the tractor operator in said seat.

7. A large size track-type tractor comprising a tractor body, an endless track at each side of said body and spaced therefrom, a radiator at the front of said body, an operator's station at the rear of said body, a dash station on said body substantially midway between said radiator and said operator's station, the tractor being of such size, the operator's station being such distance away from the dash station and the radiator being such that if a dash at the dash station extended to the same height and were of the same width of the radiator throughout, the operator's vision would be so impaired as to impede manipulation of the tractor and to endanger safety of operation, a dash secured at said dash station, the tops of said radiator and said dash being substantially horizontally in line, an engine between said dash and said radiator having a width substantially less than the width of said radiator and having the sides thereof uncovered, a cover over said engine between said dash and radiator tops, and tractor controls between said operator's station and said dash, said dash having side edges converging sharply from the top and from a width at the top substantially equal to the width of the radiator to a width at intermediate points thereof substantially equal to the width of said engine, said inwardly converging dash side edges forming recesses at locations in line with the operator's vision and cooperating with said uncovered engine sides to allow visibility from said operator's station to points adjacent and below said radiator.

HARMON S. EBERHARD.

CERTIFICATE OF CORRECTION.

Patent No. 1,970,001.     August 14, 1934.

HARMON S. EBERHARD.

It is hereby certified that error appears in the printed specification of the above numbered patent requiring correction as follows: Page 1, line 71, for "wheel 16" read wheel 6; page 2, line 110, claim 2, before "station" insert at the dash; and that the said Letters Patent should be read with these corrections therein that the same may conform to the record of the case in the Patent Office.

Signed and sealed this 18th day of September, A. D. 1934.

Leslie Frazer (Seal)     Acting Commissioner of Patents.